US012379090B2

(12) United States Patent
Kanezuka

(10) Patent No.: US 12,379,090 B2
(45) Date of Patent: Aug. 5, 2025

(54) VEHICLE LAMP

(71) Applicant: KOITO MANUFACTURING CO., LTD., Tokyo (JP)

(72) Inventor: Shohei Kanezuka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/829,317

(22) Filed: Sep. 10, 2024

(65) Prior Publication Data

US 2024/0426456 A1 Dec. 26, 2024

Related U.S. Application Data

(63) Continuation of application No. PCT/JP2023/009581, filed on Mar. 13, 2023.

(30) Foreign Application Priority Data

Mar. 24, 2022 (JP) ................................. 2022-047811

(51) Int. Cl.

*F21S 43/40* (2018.01)
*F21S 43/20* (2018.01)
*F21S 45/48* (2018.01)
*F21S 45/50* (2018.01)
*F21W 103/10* (2018.01)

(52) U.S. Cl.

CPC ....... *F21S 43/402* (2024.05); *F21S 43/28131* (2024.05); *F21S 45/48* (2018.01); *F21S 45/50* (2018.01); *F21W 2103/10* (2018.01)

(58) Field of Classification Search

CPC ...... F21W 2103/10; F21S 45/48; F21S 45/50; F21S 43/28131; F21S 43/402

See application file for complete search history.

(56) References Cited

U.S. PATENT DOCUMENTS

2016/0312972 A1 10/2016 Izawa

FOREIGN PATENT DOCUMENTS

| | | | | |
|---|---|---|---|---|
| JP | H04-24214 U1 | | 2/1992 | |
| JP | H08-022707 A | | 1/1996 | |
| JP | 2000-082323 A | | 3/2000 | |
| JP | 2003151311 A | * | 5/2003 | ........... B60Q 1/2607 |
| JP | 2016-207470 A | | 12/2016 | |
| JP | 2018195466 A | * | 12/2018 | .............. F21S 43/14 |

OTHER PUBLICATIONS

Innovation Q+ NPL Search (Year: 2024).*

International Search Report issued on Apr. 18, 2023 for WO 2023/182044 A1 (4 pages).

* cited by examiner

*Primary Examiner* — Anabel Ton

(74) *Attorney, Agent, or Firm* — LICA, Inc.

(57) ABSTRACT

A vehicle lamp includes: an outer lens disposed on a front side of the vehicle lamp; a lamp body disposed on a rear side of the vehicle lamp; and a light source disposed within a lamp chamber formed by the outer lens and the lamp body. A fine step is formed on a rear surface of the outer lens, and light from the light source enters the outer lens.

12 Claims, 11 Drawing Sheets

30

VEHICLE LAMP

CROSS REFERENCE TO RELATED APPLICATIONS

This application is a continuation application of International Patent Application No. PCT/JP2023/009581, filed on Mar. 13, 2023, which claims priority from Japanese Patent Application No. 2022-047811, filed on Mar. 24, 2022, with the Japan Patent Office, the disclosures of which are incorporated herein in their entireties by reference.

TECHNICAL FIELD

The present disclosure relates to a vehicle lamp.

BACKGROUND

Conventional vehicle lamps include a lamp having an inner lens with a reflective step in a light chamber formed by a lamp body and a transparent outer lens. The lamp transmits light from the inner lens through the outer lens to emit light by using the inner lens as a light-emitting element (e.g., Japanese Patent Laid-Open Publication No. 2016-207470).

SUMMARY

As illustrated in FIG. 12, a lamp includes an inner lens 4 as a light-emitting element, within a light chamber S formed by a lamp body 1 and an outer lens 2. Considering that in a component space 6 which is required between the outer lens 2 and the inner lens 4, light from the inner lens 4 is not incident on an edge 2' of the outer lens 2 (as illustrated by the arrows), so that the edge 2' of the outer lens 2 may not emit light to an end of the outer lens 2.

Similarly, as illustrated in FIG. 13, even when the inner lens 4 is integrally molded on an inner side (on a side of the light chamber S) of the outer lens 2, considering that the outer lens 2 includes a seal leg 2" with the lamp body 1, the light from the inner lens 4 is not incident on the edge 2' of the outer lens 2 (as illustrated by the arrows) by an amount equal to a thickness of the seal leg 2". As a result, the edge 2' of the outer lens 2 may not emit light to an end thereof.

The present disclosure solves the above-described problem by providing a vehicle lamp that emits light which illuminates along an outer lens to an end of the outer lens.

To solve the above problem, a vehicle lamp according to an aspect of the present disclosure includes: an outer lens disposed on a front side of the vehicle lamp; a lamp body disposed on a rear side of the vehicle lamp; and a light source disposed within a lamp chamber formed by the outer lens and the lamp body, wherein a fine step (or a minute step) is formed on a rear surface of the outer lens, and light from the light source enters the outer lens.

In the above aspect, the outer lens may be formed by stacking different types of a first resin material and a second resin material. The first resin material may form a front surface of the outer lens, and the second resin material may form the rear surface of the outer lens including the fine step.

In the above aspect, the first resin material may be a resin having a strength higher than the second resin material.

In the above aspect, the outer lens may include a seal leg with the lamp body at an end thereof, the seal leg being formed of the first resin material.

In the above aspect, the outer lens may include a light entrance end in addition to the seal leg with the lamp body, at the end thereof in a direction of an extension axis of the outer lens, the light source may be disposed opposite to the light entrance end, and the light entrance end may be formed of the second resin material.

In the above aspect, the outer lens may be provided with a step such that the front surface of the outer lens becomes coplanar with a panel front surface of a vehicle body panel.

In the above aspect, an extension panel having a shape substantially the same as that of a design light-emitting portion on the front surface of the outer lens may be additionally disposed between the outer lens and the lamp body.

In the above aspect, an inner lens, forming a light distribution different from a light distribution formed by the light source and the outer lens, may be additionally disposed between the outer lens and the lamp body.

According to the present disclosure, it is possible to provide a vehicle lamp allowing an outer lens to emit light to an end thereof.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
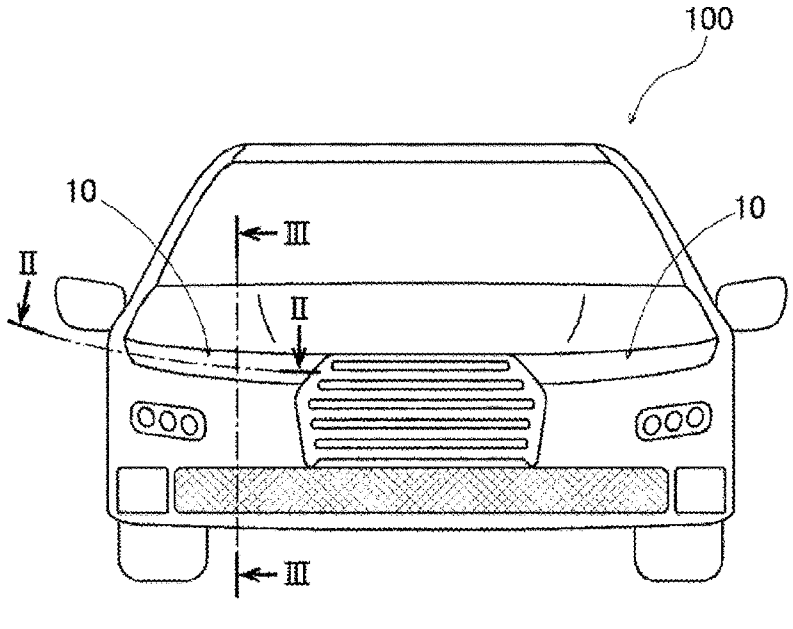
FIG. 1 is a front view of a vehicle 100 including a vehicle lamp 10 according to a first embodiment of the present disclosure.

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, the present disclosure will be described based on embodiments with reference to the drawings. The same or similar components, members, and processes are denoted by the same reference numerals, and a redundant description thereof will be omitted as appropriate. Further, the embodiments are illustrative and not intended to limit the present disclosure. It should be understood that not all of the features and the combination thereof discussed are essential to the invention. Furthermore, when the terms "up," "down," "before," "after," "left," "right," "inside," "outside," "surface," "back," "front," and "rear" are used herein to denote orientations, they are intended to refer to the orientation of a lamp in a position when the lamp is mounted on a vehicle. In the drawings, a front-to-back direction of the lamp is indicated by arrows F-B and a left-to-right direction of the lamp is indicated by arrows L-R.

1. First Embodiment

Figure 2:
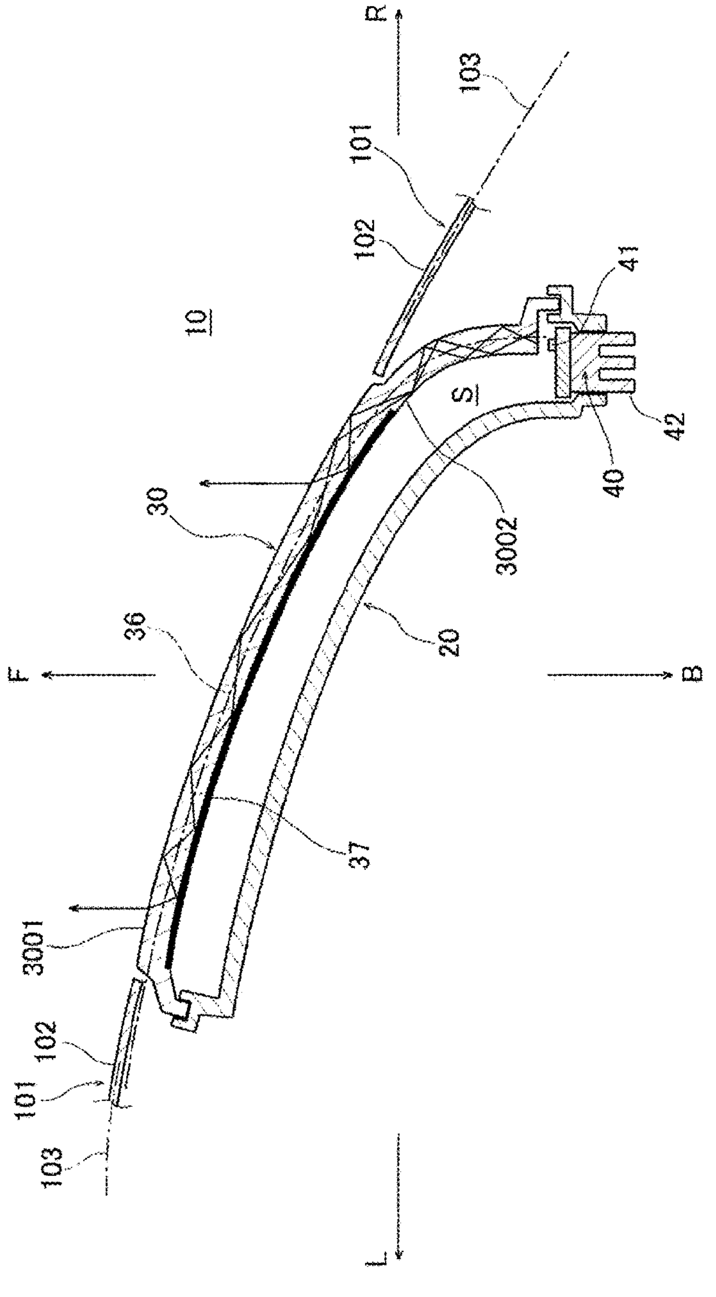
FIG. 2 is a transverse cross-sectional view of the vehicle lamp 10.
Figure 3:
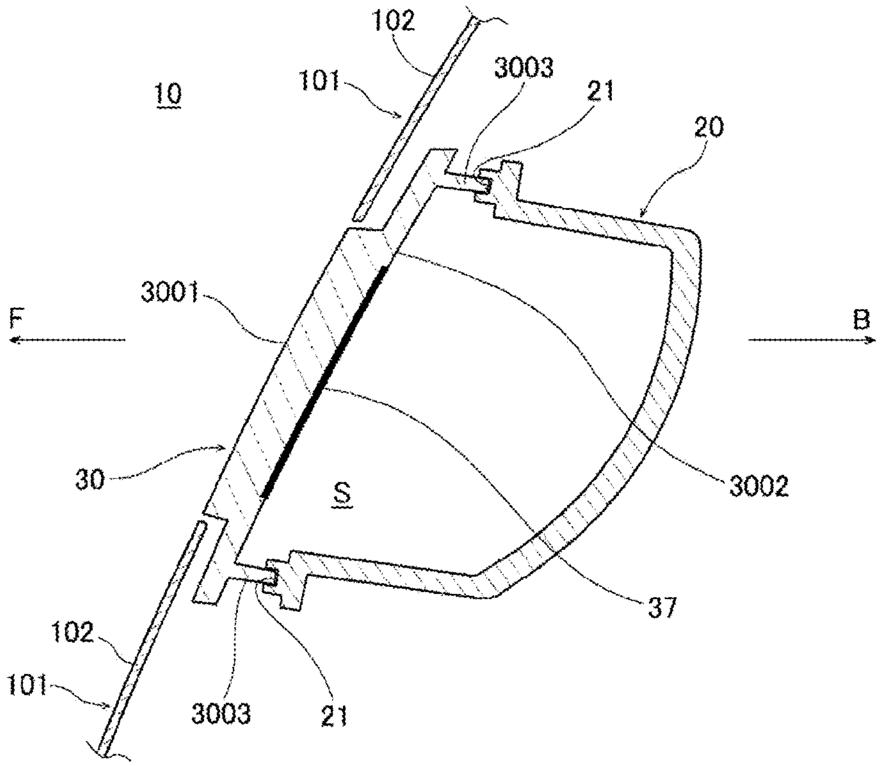
FIG. 3 is a vertical cross-sectional view of the vehicle lamp 10.
Figure 4:
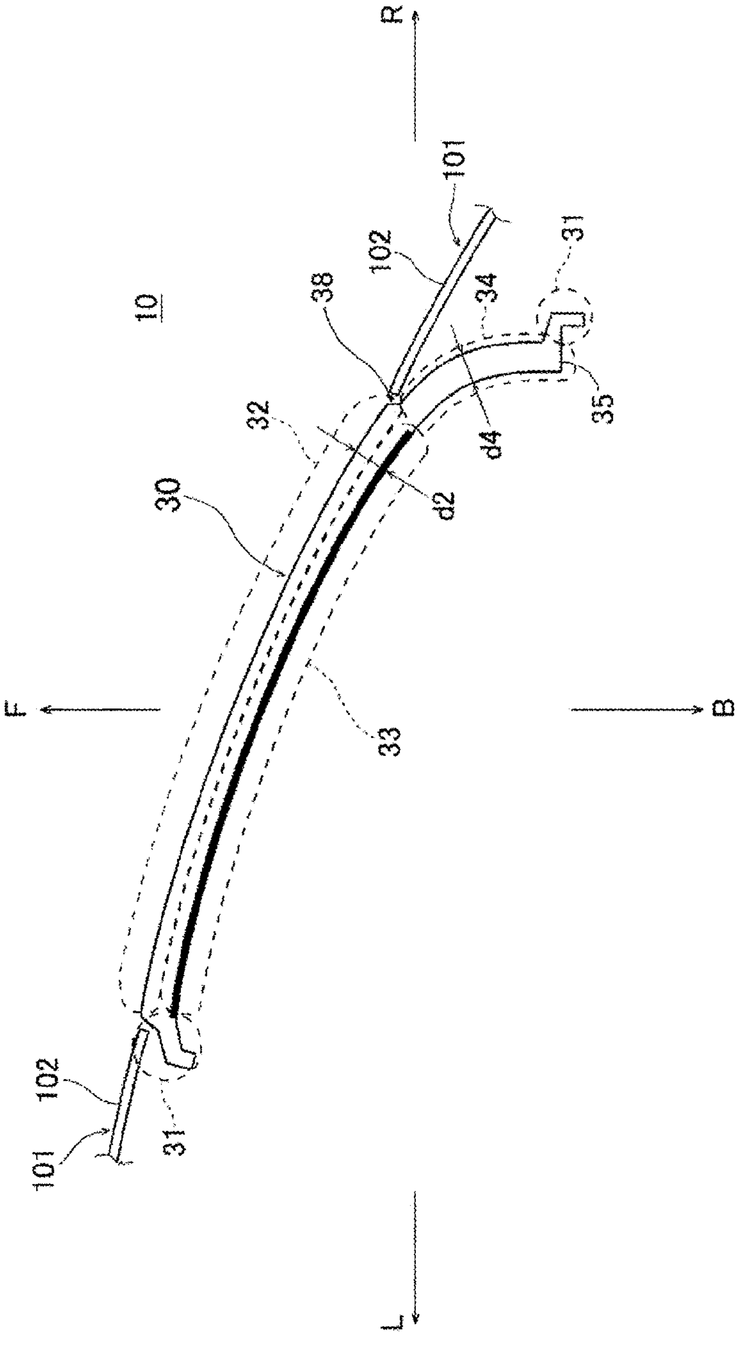
FIG. 4 is a transverse cross-sectional view to illustrate an outer lens 30 by function.

FIG. 1 is a front view of the vehicle 100 including the vehicle lamp 10 according to the first embodiment of the present disclosure. FIG. 2 is a transverse cross-sectional view (cross-sectional view taken along line II-II in FIG. 1) of the vehicle lamp 10. FIG. 3 is a vertical cross-sectional view (cross-sectional view taken along line III-III in FIG. 1) of the vehicle lamp 10. FIG. 4 is a transverse cross-sectional view (cross-sectional view taken in the same direction as in FIG. 2) to illustrate the outer lens 30 by function. The vehicle lamp 10 (hereinafter, also simply referred to as the "lamp 10") is applied as a position lamp on a left side and a right side of the vehicle 100. However, the vehicle lamp 10 is not limited to this specific example, and may be applied as other lamps such as a clearance lamp, a daytime running lamp, a tail lamp, and a stop lamp. As illustrated in FIG. 1, the vehicle lamp 10 extends in the left-to-right direction of the vehicle 100 and is attached to the vehicle 100. As illustrated in FIG. 2, a portion of the vehicle lamp 10 is exposed from an opening of a vehicle body panel 101.

The vehicle lamp 10 includes a lamp body 20, the outer lens 30, and a light source unit 40 (see, e.g., FIG. 2). The lamp body 20 is formed in a shape of a box with an opening in front thereof, and includes a seal groove 21 (see, e.g., FIG. 3) with the outer lens 30 at a peripheral edge of the opening. After a sealant (not illustrated) is injected into the seal groove 21, a seal leg 3003 (to be described later) of the outer lens 30 is fitted into the seal groove 21, so that the outer lens 30 and the lamp body 20 form a lamp chamber S having dustproof and waterproof properties.

The light source unit 40 is formed by combining a heat sink 42 with an aluminum substrate including one or more light sources 41 for a position lamp (see, e.g., FIG. 2). The light source unit 40 is positioned such that the light source 41 is disposed at a light entrance end 35 (to be described later) of the outer lens 30, and is fixed to the lamp body 20. A configuration of the light source unit 40 is not limited to this specific example. The light source 41 may be a light-emitting diode or a laser diode, but is not limited.

The outer lens 30 has a plate-shape and includes a front surface 3001 that is outside of the lamp chamber S, and a rear surface 3002 o that is inside of the lamp chamber S. The outer lens 30 includes an extension axis 36 in the left-to-right direction of the vehicle 100 (see, e.g., FIG. 2). As illustrated in FIG. 4, the outer lens 30 functionally includes a seal portion 31, a design light-emitting portion 32, a step formation portion 33, and a light entrance portion 34.

The seal portion 31 is a peripheral end of the rear surface 3002 of the outer lens 30 and is a portion adjacent to the seal leg 3003 (see, e.g., FIG. 3) protruding rearward (toward the seal groove 21 of the lamp body 20).

The design light-emitting portion 32 includes a portion of the front surface 3001 of the outer lens 30 and is a portion exposed from the vehicle body panel 101. The design light-emitting portion 32 serves as a design portion that is partially viewed from the vehicle body panel 101 when not turned ON, and serves as a light-emitting portion when turned ON. The extension axis 36 in a portion of the outer lens 30 including the design light-emitting portion 32 is formed to be parallel to a vehicle body curve 103 (see, e.g., FIG. 2) of the vehicle 100. A thickness d2 of the outer lens 30 in the portion of the outer lens 30 including the design light-emitting portion 32 is formed to be greater than a thickness d4 of the outer lens 30 in the light entrance portion 34 (see, e.g., FIG. 4). Accordingly, the front surface 3001 of the outer lens 30 includes a step portion 38 between the design light-emitting portion 32 and the light entrance portion 34 in a direction of the extension axis 36 (see, e.g., FIG. 4). Due to the step portion 38, the front surface 3001 of the design light-emitting portion 32 rises further forward of the lamp than the front surface 3001 of the light entrance portion 34, so that the front surface 3001 of the design light-emitting portion 32 becomes coplanar with a panel front surface 102 of the vehicle body panel 101.

The light entrance portion 34 is a portion that is formed at an end of one side of the outer lens 30 in the direction of the extension axis 36 and not exposed from the vehicle body panel 101. In the embodiment, the light entrance portion 34 is formed at a right end of the outer lens 30 (see, e.g., FIG. 4). The extension axis 36 in the portion of the outer lens 30 including the light entrance portion 34 has a curvature different from that of the vehicle body curve 103 of the vehicle 100, and the light entrance portion curves rearward from the vehicle body curve 103 (see, e.g., FIG. 2). The light entrance portion 34 includes the light entrance end 35 (see, e.g., FIG. 4). The light entrance end 35 is an end face of the outer lens 30, which is formed in a direction perpendicular to the extension axis 36 and is formed as an end different from an end of the outer lens forming the seal leg 3003. The light source 41 is disposed to face the light entrance end 35, and light from the light source 41 (hereinafter, referred to as light source light) enters the outer lens 30 from the light entrance end 35 and is guided inside the outer lens 30.

The step formation portion 33 includes a portion of the rear surface 3002 of the outer lens 30, and is a portion formed at least behind the design light-emitting portion 32 (see, e.g., FIG. 4). The step formation portion 33 is provided with fine steps 37 (see, e.g., FIG. 2).

Figure 5:
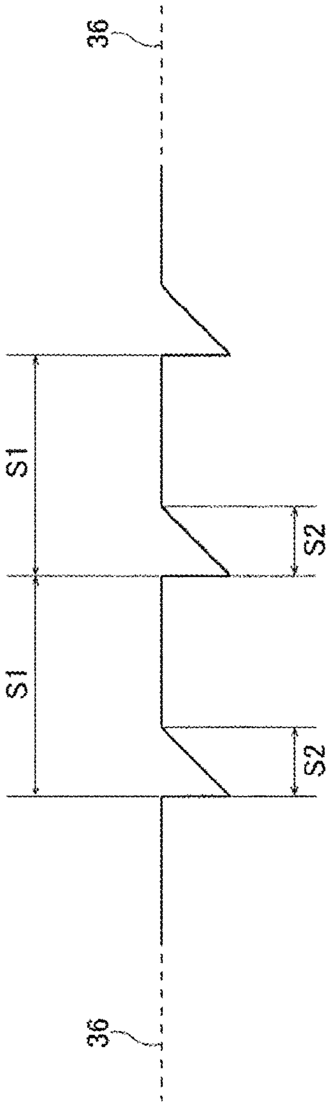
FIG. 5 is an enlarged view to illustrate a fine step (or a minute step) 37 of the outer lens 30.

The fine steps 37 are configured by forming steps having a prism shape, a wedge shape, a V-groove shape, or an uneven shape at an interval (with a step pitch) in the direction of the extension axis 36. Herein, the fine steps 37 refer to steps formed with a step density of 30% or less, with respect to a step pitch of 0.1 to 0.5 mm. As illustrated in FIG. 5, the step density is a ratio of a step size S2 to a step pitch S1 in the direction of the extension axis 36. As a suitable example, the fine steps 37 are formed with a step pitch of 0.2 mm to 0.3 mm and a step size of 0.05 mm. In the drawings, the fine steps 37 with such dimensions are illustrated by a thick line.

Figure 6:
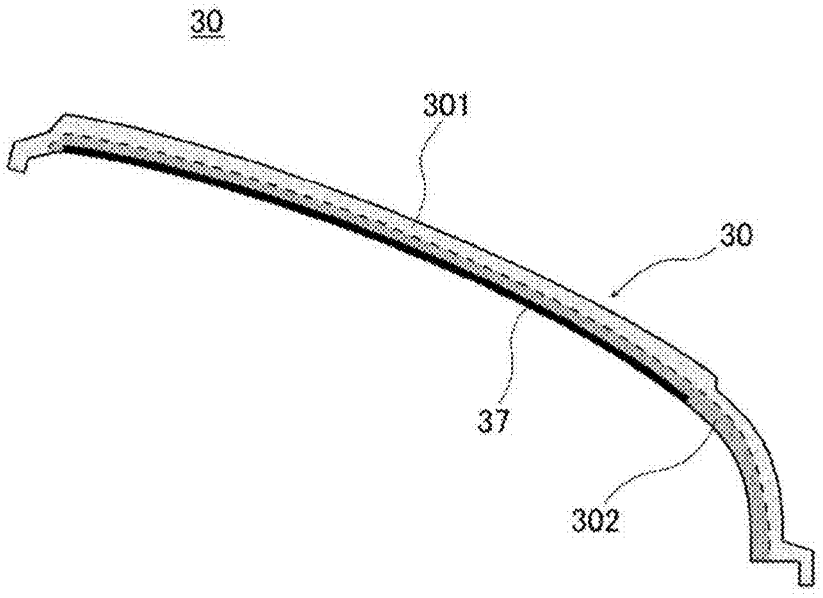
FIG. 6 is a transverse cross-sectional view to illustrate the outer lens 30 by material.
Figure 7:
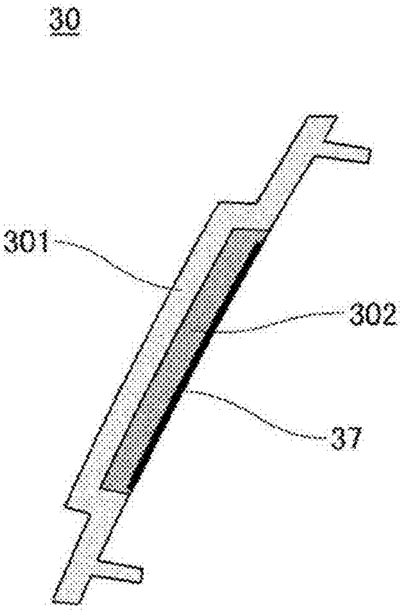
FIG. 7 is a vertical cross-sectional view to illustrate the outer lens 30 by material.

The outer lens 30 including the above elements is formed by stacking different types of a first resin material 301 and a second resin material 302. FIG. 6 is a transverse cross-sectional view to illustrate the outer lens 30 by material. FIG. 7 is a vertical cross-sectional view to illustrate the outer lens 30 by material. Both FIG. 6 and FIG. 7 are end surface views seen from the same direction as in FIG. 2 and FIG. 3, respectively. In FIGS. 6 and 7, the first resin material 301 and the second resin material 302 are illustrated in different colors.

The first resin material 301 and the second resin material 302 have different components. The first resin material 301 includes a bluing agent and has a strength higher than the strength of the second resin material 302. The second resin material 302 includes a lesser amount of the bluing agent than that of the first resin material 301 and has a greater heat resistant than the first resin material 301.

The first resin material 301 includes a bluing agent to provide transparency. The bluing agent is a colorant that absorbs orange or yellow light to provide a blue or purple color. A type of the bluing agent is not particularly limited, and one or more of known organic or inorganic colorants are added in combination, in the bluing agent. In addition, as for the first resin material 301, a resin having a strength higher than the second resin material 302 is selected to provide strength required for the outer cover. For example, as for the first resin material 301, a colorless transparent or colored transparent polycarbonate or acrylic may be used.

The second resin material 302 includes a lesser amount of the bluing agent compared to the first resin material 301, and typically, does not include any bluing agent, in order to facilitate the formation of the fine steps 37 (in order to prevent cracking). Further, as for the second resin material 302, a resin having higher heat resistance than the first resin material is selected in order to facilitate the formation of the fine steps 37 (in order to prevent resin sagging). As for the second resin material 302, for example, a colorless and transparent polycarbonate having a greater molecular weight than that of the first resin material 301 may be used.

The front surface 3001 of the outer lens 30 is formed of the first resin material 301, and the rear surface 3002 of the outer lens 30 is formed of the second resin material 302. The design light-emitting portion 32, the front surface 3001 of the light entrance portion 34, and the seal portion 31 (including the seal leg 3003) of the outer lens 30 are formed of the first resin material 301. The step formation portion 33 and the rear surface 3002 of the light entrance portion 34 (including the light entrance end 35) of the outer lens 30 are formed of the second resin material 302. Preferably, the first resin material 301 and the second resin material 302 are formed in a ratio of approximately one to one in a width direction of the outer lens 30, and are stacked, for example, by two-color molding. However, modifications may be made to increase the ratio of the first resin material 301, thereby increasing the transparency and/or strength of the vehicle lamp 10, and to increase the ratio of the second resin material 302, thereby increasing the formation accuracy of the steps.

The appearance of the vehicle lamp 10 with the above configuration when turned ON and when not turned ON will be described.

(When Turned ON)

When the vehicle lamp 10 is turned ON, in the vehicle lamp 10, light (hereinafter, referred to as light source light) from the light source 41 enters the outer lens 30 directly from the light entrance end 35 and is guided inside the outer lens 30, so that the front surface 3001 of the outer lens 30 emits light directly, without passing through other members or spaces. In addition, since the light source light is internally reflected at each fine step 37 in the design light-emitting portion 32, the entirety of the front surface 3001 of the outer lens 30 emits light to the end thereof without appearing to have attenuation of the light in the direction of the extension axis 36, so that the vehicle lamp 10 has a good appearance, in which the entirety of the design light-emitting portion 32 exposed from the vehicle body panel 101 emits light uniformly from surfaces thereof. In addition, the design light-emitting portion 32 is coplanar with the panel front surface 102 of the vehicle body panel 101 due to the step portion 38, so that a light-emitting surface thereof is continuous with the vehicle body curve 103 of the vehicle 100.

(When Not Turned ON)

When the vehicle lamp 10 is not turned ON, in the vehicle lamp 10, the design light-emitting portion 32 exposed from the vehicle body panel 101 becomes a portion of the design of the vehicle 100. Since the front surface 3001 of the design light-emitting portion 32 is made of a transparent first resin material 301, the fine steps 37 formed on the rear surface 3002 of the design light-emitting portion 32 are visible through the front surface 3001. However, when the fine steps 37 have the step pitch and the step size as described above, the outer lens 30 does not appear cloudy white, and the vehicle lamp 10 is visually recognized as a transparent design part while maintaining the transparency of the first resin material 301. When the first resin material 301 is made of a colored transparent material (smoke), since an internal structure of the lamp chamber S may be invisible, the presence of the vehicle lamp is reduced and thus, a design property of the vehicle lamp is improved when the vehicle lamp is not turned ON.

In this manner, when the vehicle lamp 10 of the embodiment is turned ON, the outer lens 30 emits light to the end, the vehicle lamp 10 may have a good appearance of uniform light emission over a surface thereof. When the vehicle lamp 10 is not turned ON, the vehicle lamp 10 may have an improved appearance as a transparent design part.

2. Modification of First Embodiment

Figure 8:
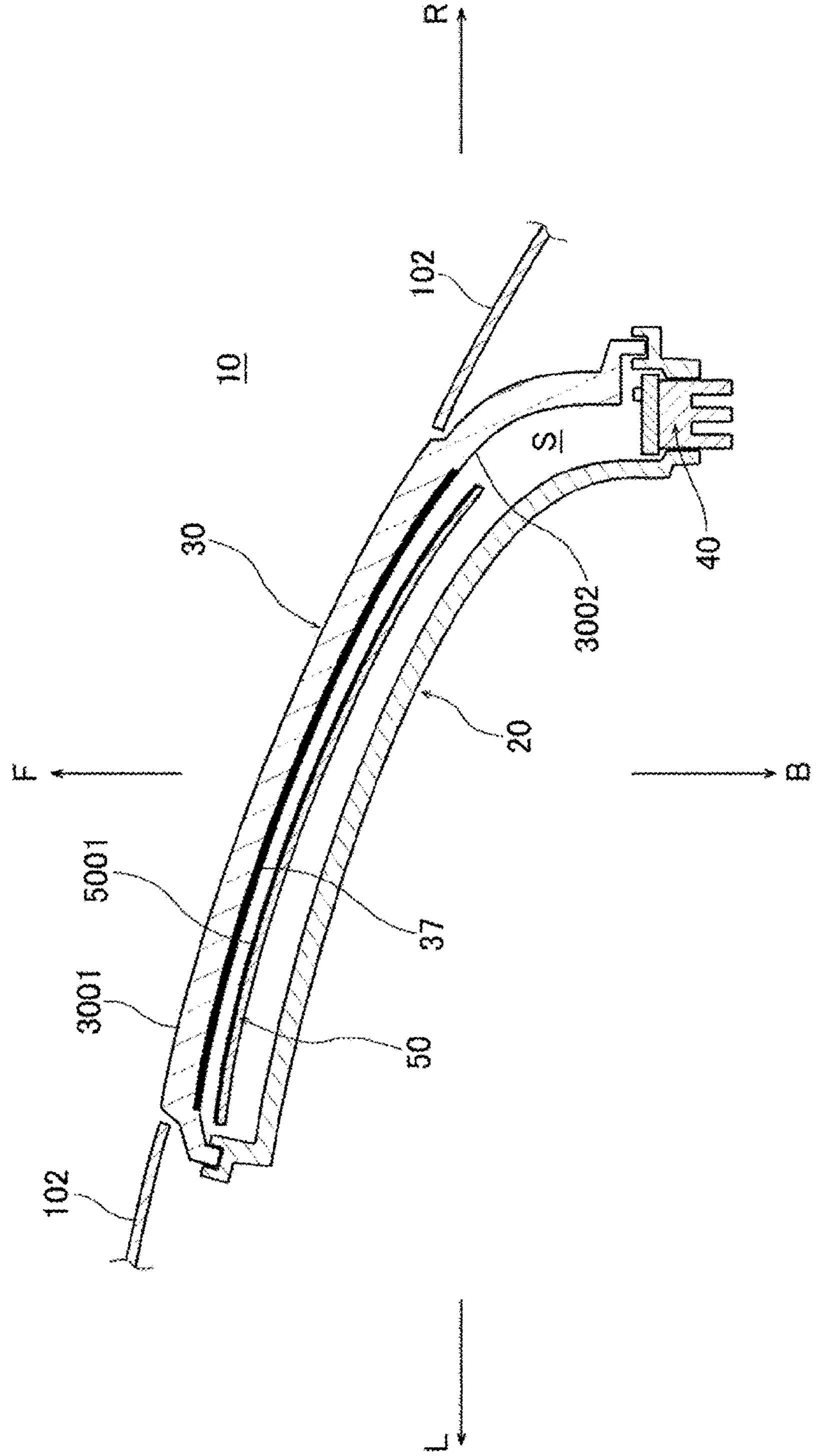
FIG. 8 is a transverse cross-sectional view of the vehicle lamp 10 according to a suitable modification of the first embodiment.

FIG. 8 is a transverse cross-sectional view of the vehicle lamp 10 according to a suitable modification of the first embodiment, which is viewed from the same direction as in FIG. 2. In the vehicle lamp 10 of the modification, an extension panel 50 is additionally disposed between the outer lens 30 and the lamp body 20, within the lamp chamber S. The extension panel 50 is a plate-shaped design part formed in substantially the same shape as the design light-emitting portion 32 at least when viewed from the front of the lamp. The extension panel 50 is made of a black material or white material without aluminum deposition, or a plate material with aluminum deposition on a front surface 5001 of the extension panel 50. The extension panel 50 is fixed to the lamp body 20 at its upper and lower ends.

In the vehicle lamp 10 of the modification, when the vehicle lamp is turned ON, the outer lens 30 emits light in the same manner as in the first embodiment, due to the fine steps 37, and light leaking from the rear surface 3002 of the outer lens 30 is reflected by the front surface 5001 of the extension panel 50 and directed toward the front surface 3001 of the outer lens 30, so that light emitted from the outer lens 30 may be increased. In addition, when the vehicle lamp is not turned ON, the internal structure of the lamp chamber S is hidden and invisible by the extension panel 50, so that the presence of the lamp may be eliminated. Thus, the appearance of the vehicle lamp may be improved as a design part when the vehicle lamp is not turned ON.

3. Second Embodiment

Figure 9:
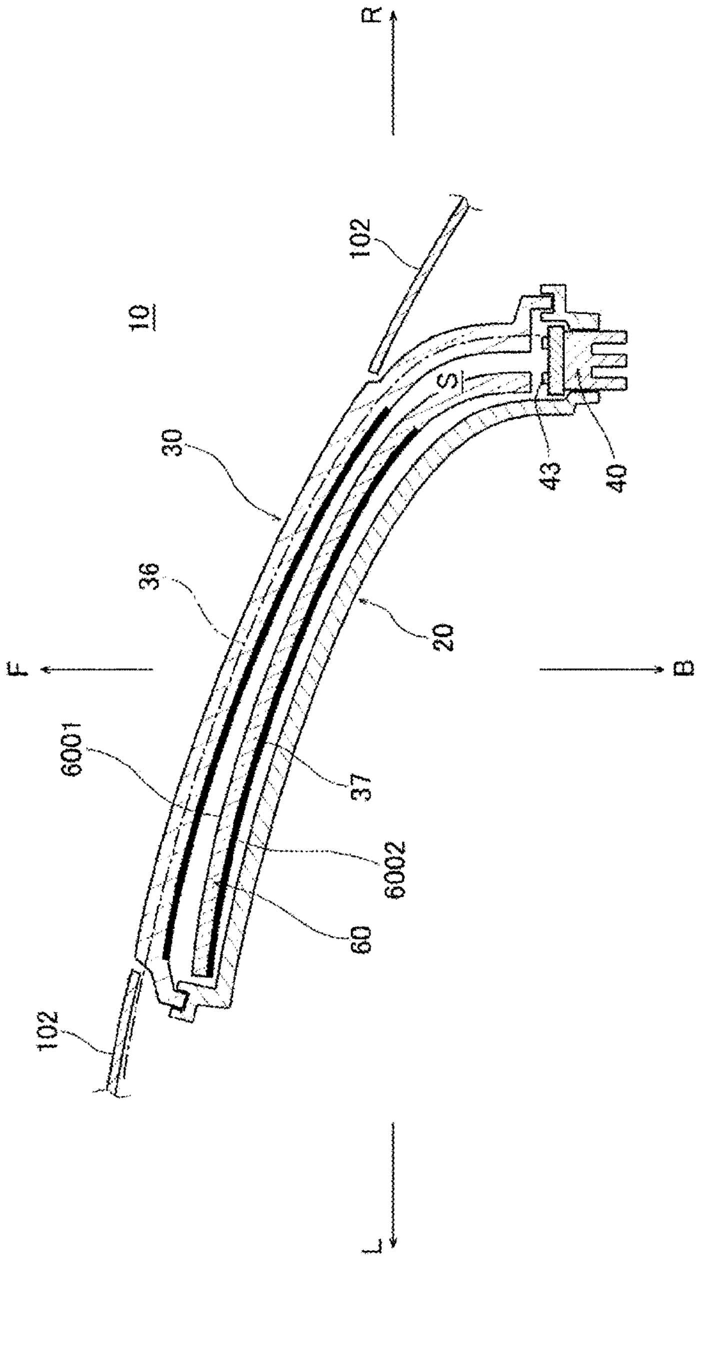
FIG. 9 is a transverse cross-sectional view of the vehicle lamp 10 according to a second embodiment of the present disclosure.
Figure 10:
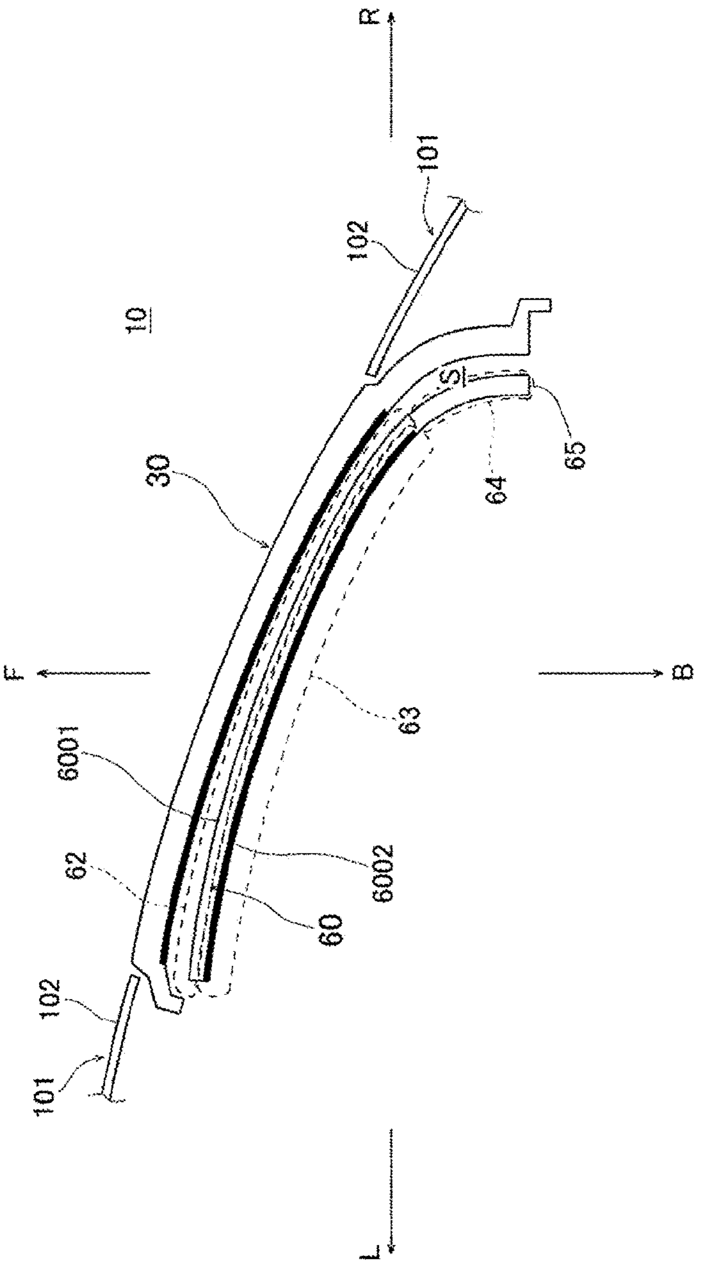
FIG. 10 is a transverse cross-sectional view to illustrate an inner lens 60 by function.

FIG. 9 is a transverse cross-sectional view of the vehicle lamp 10 according to the second embodiment of the present disclosure, and FIG. 10 is a transverse cross-sectional view to illustrate the inner lens 60 by its function. Both FIG. 9 and FIG. 10 are viewed in the same direction as in FIG. 2. In the vehicle lamp 10 of the embodiment, the inner lens 60 is additionally disposed between the outer lens 30 and the lamp body 20, within the lamp chamber S. The inner lens 60 forms a light distribution different from a light distribution formed by the outer lens 30 and the light source 41. The inner lens 60 may be of a plate shape having substantially the same shape as the design light-emitting portion 32 of the outer lens 30, or may be of a columnar shape depending on the design of the vehicle lamp 10, but has a shape along the extension axis 36 of the outer lens 30.

The inner lens 60 includes a front surface 6001 and a rear surface 6002 (see, e.g., FIG. 9), and functionally includes a design light-emitting portion 62, a step formation portion 63, and a light entrance portion 64 (see, e.g., FIG. 10). The design light-emitting portion 62 includes the front surface 6001 of the inner lens 60, and serves as a design portion of the vehicle lamp 10 when the vehicle lamp is not turned ON while serving as a light-emitting portion when the vehicle lamp is turned ON. The light entrance portion 64 includes an incident surface 65 formed at an end of one side of the inner lens 60, and the incident surface 65 is disposed opposite to an additional light source 43 provided on an aluminum substrate of the light source unit 40. The step formation portion 63 includes the rear surface 6002 of the inner lens 60, and is a portion that forms at least the fine steps 37 behind the design light-emitting portion 62. Since the inner lens 60 is a member disposed in the lamp chamber S, the inner lens 60 may be formed of the second resin material 302, in terms of facilitating the formation of the fine steps 37. In the embodiment, the additional light source 43 is a light-emitting diode of amber color, and the inner lens 60 and the additional light source 43 form a light distribution of a turn signal lamp.

In the vehicle lamp 10 of the embodiment, when the light source 41 is turned ON, the outer lens 30 emits light as a position lamp in the same manner as in the first embodiment. When the additional light source 43 is turned ON, the inner lens 60 emits light as a turn signal lamp as follows. The light source light entering the light entrance portion 64 of the inner lens 60 is internally reflected at each fine step 37 of the step formation portion 63, so that the design light-emitting portion 62 emits light to the end thereof in the direction of the extension axis 36. Thus, the entire design light-emitting portion 62 emits light uniformly from the surface thereof. The light emitted from the inner lens 60 is further diffused through the fine steps 37 of the step formation portion 33 of the outer lens 30 and is emitted from the front surface 3001 of the outer lens 30. When the vehicle lamp is not turned ON, the inner lens 60 is visible from the outer lens 30. However, since the inner lens 60 also includes the fine steps 37, the vehicle lamp 10 is visually recognized as a transparent design part without the inner lens 60 appearing cloudy white.

4. Modification of Second Embodiment

Figure 11:
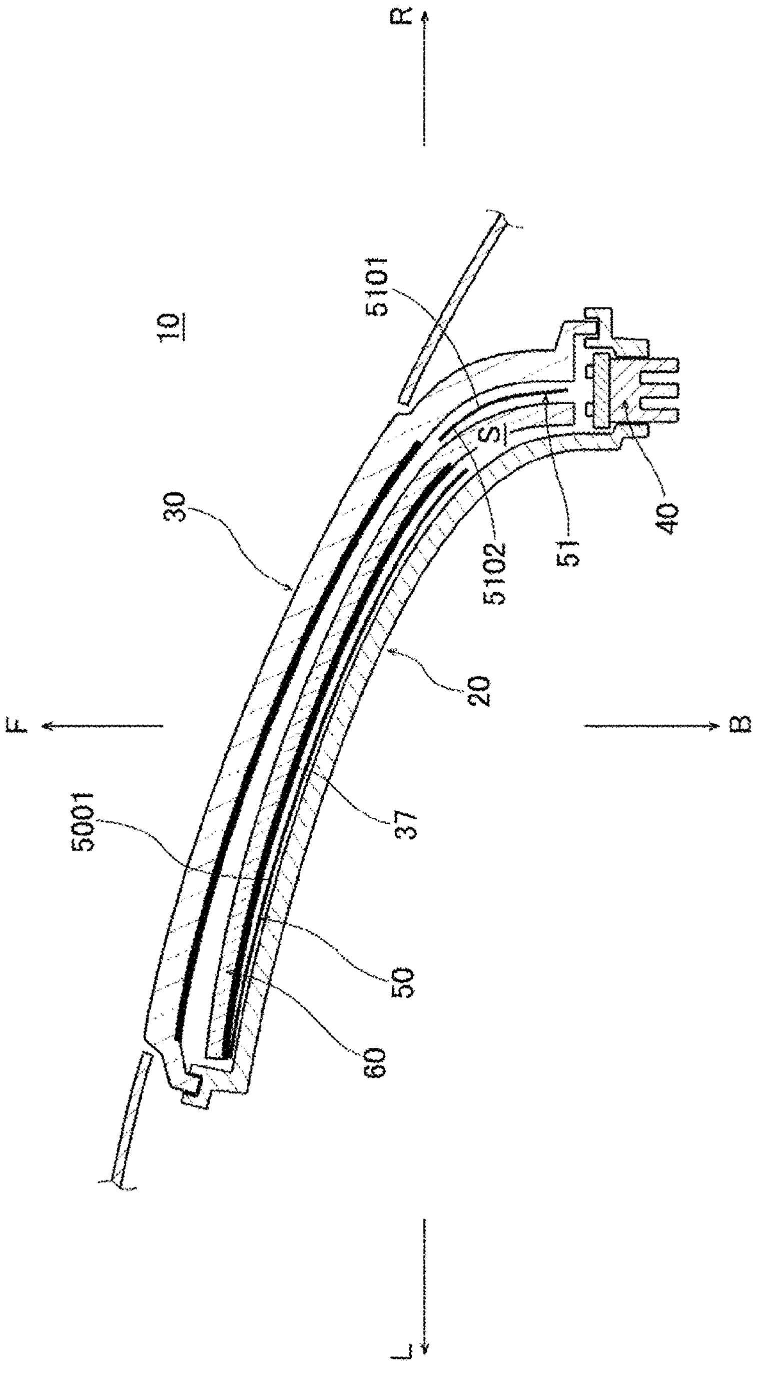
FIG. 11 is a transverse cross-sectional view of the vehicle lamp 10 according to a suitable modification of the second embodiment.
Figure 12:
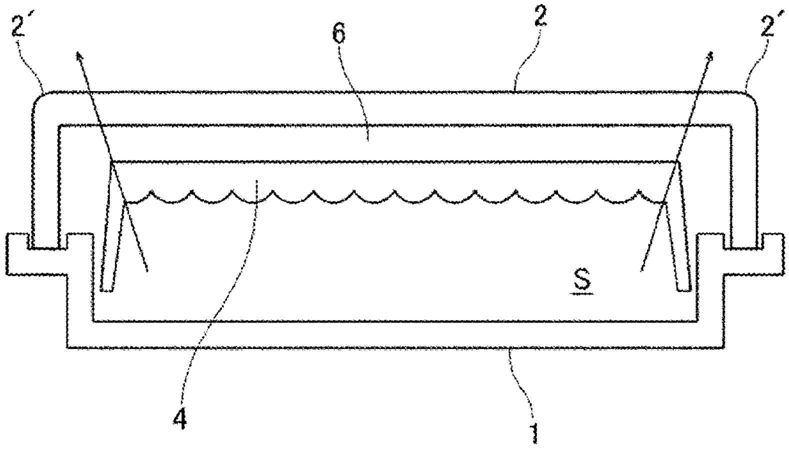
FIG. 12 is a transverse cross-sectional view of a conventional vehicle lamp.
Figure 13:
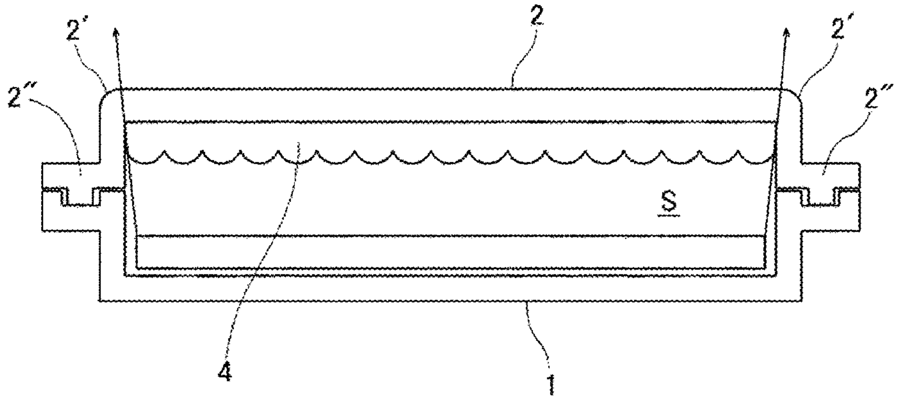
FIG. 13 is a transverse cross-sectional view of a conventional separate vehicle lamp.

FIG. 11 is a transverse cross-sectional view of the vehicle lamp 10 according to a suitable modification of the second embodiment of the present disclosure, which is seen in the same direction as in FIG. 2. In the vehicle lamp 10 of the modification, the extension panel 50 is disposed between the inner lens 60 and the lamp body 20 of the second embodiment. In addition, an additional extension panel 51 is disposed between the light entrance portion 64 of the inner lens 60 and the light entrance portion 34 of the outer lens 30. The additional extension panel 50 is a plate-shaped part formed in substantially the same shape as the light entrance portions 34 and 64 in the direction of the extension axis 36, and is formed of a polybutylene terephthalate (PBT) resin. Aluminum deposition is applied to a front surface 5101 and a rear surface 5102 of the additional extension panel 51. The additional extension panel 51 is fixed to the lamp body 20 at the upper and lower ends thereof.

In the vehicle lamp 10 of the modification, when the vehicle lamp is turned ON, the outer lens 30 and the inner lens 60 emit light in the same manner as in the second embodiment, due to the fine steps 37, and the light leaking rearward from the outer lens 30 and the inner lens 60 is reflected by the front surface 5001 of the extension panel 50, and directed toward the front surface 3001 of the outer lens 30, so that light emitted from the outer lens 30 and the inner lens 60 may be increased. In addition, the front surface 5101 of the additional extension panel 51 returns light leaking from the light entrance portion 34 of the outer lens 30, to the outer lens 30, and the rear surface 5102 of the additional extension panel 51 returns light leaking from the light entrance portion 34 of the inner lens 60, to the inner lens 60, so that light emitted from the outer lens 30 and the inner lens 60 may be further increased. Furthermore, when the vehicle lamp is not turned ON, a structure of the lamp body 20 is hidden and invisible by the extension panel 50, and a structure of the light source unit 40 is hidden and invisible by the additional extension panel 51, so that the appearance of the vehicle lamp as a design part may be improved when the lamp is not turned ON.

The embodiments and modifications of the present disclosure have been described above. However, these are merely examples of the present disclosure, and combinations thereof may be made based on the knowledge of a person skilled in the art, and such combinations are also included within the scope of the present disclosure.

From the foregoing, it will be understood that various examples of the present disclosure are described for illustrative purposes, and that various variations may be made without departing from the scope and idea of the present disclosure. Therefore, the various examples disclosed herein are not intended to limit the essential scope and ideas designated by each of the following claims.

What is claimed is:

1. A vehicle lamp comprising:
- an outer lens disposed on a front side of the vehicle lamp;
- a lamp body disposed on a rear side of the vehicle lamp; and
- a light source disposed within a lamp chamber formed by the outer lens and the lamp body,
- wherein a fine step is formed on a rear surface of the outer lens, and
- light from the light source enters the outer lens,
- wherein the outer lens is formed by stacking different types of a first resin material and a second resin material,
- the first resin material forms a front surface of the outer lens, and
- the second resin material forms the rear surface of the outer lens including the fine step.

2. The vehicle lamp according to claim 1, wherein the first resin material is a resin having a strength higher than the second resin material.

3. The vehicle lamp according to claim 2, wherein the outer lens includes a seal leg with the lamp body at an end thereof, the seal leg being formed of the first resin material.

4. The vehicle lamp according to claim 2, wherein the outer lens includes a light entrance end in addition to the seal leg with the lamp body, at the end thereof in a direction of an extension axis of the outer lens, the light source is disposed opposite to the light entrance end, and the light entrance end is formed of the second resin material.

5. The vehicle lamp according to claim 2, wherein the outer lens is provided with a step such that the front surface of the outer lens becomes coplanar with a panel front surface of a vehicle body panel.

6. The vehicle lamp according to claim 2, further comprising:

an extension panel having a shape substantially the same as that of a design light-emitting portion on the front surface of the outer lens, between the outer lens and the lamp body.

7. The vehicle lamp according to claim 2, further comprising:

an inner lens forming a light distribution different from a light distribution formed by the light source and the outer lens, between the outer lens and the lamp body.

8. The vehicle lamp according to claim 1, wherein the outer lens includes a seal leg with the lamp body at an end thereof, the seal leg being formed of the first resin material.

9. The vehicle lamp according to claim 1, wherein the outer lens includes a light entrance end in addition to a seal leg with the lamp body, at the end thereof in a direction of an extension axis of the outer lens, the light source is disposed opposite to the light entrance end, and the light entrance end is formed of the second resin material.

10. The vehicle lamp according to claim 1, wherein the outer lens is provided with a step such that the front surface of the outer lens becomes coplanar with a panel front surface of a vehicle body panel.

11. A vehicle lamp comprising:

an outer lens disposed on a front side of the vehicle lamp;

a lamp body disposed on a rear side of the vehicle lamp;

a light source disposed within a lamp chamber formed by the outer lens and the lamp body; and an extension panel having a shape substantially the same as that of a design light-emitting portion on the front surface of the outer lens, between the outer lens and the lamp body, wherein a fine step is formed on a rear surface of the outer lens, and light from the light source enters the outer lens.

12. The vehicle lamp according to claim 1, further comprising:

an inner lens forming a light distribution different from a light distribution formed by the light source and the outer lens, between the outer lens and the lamp body.

* * * * *